Figure 1:
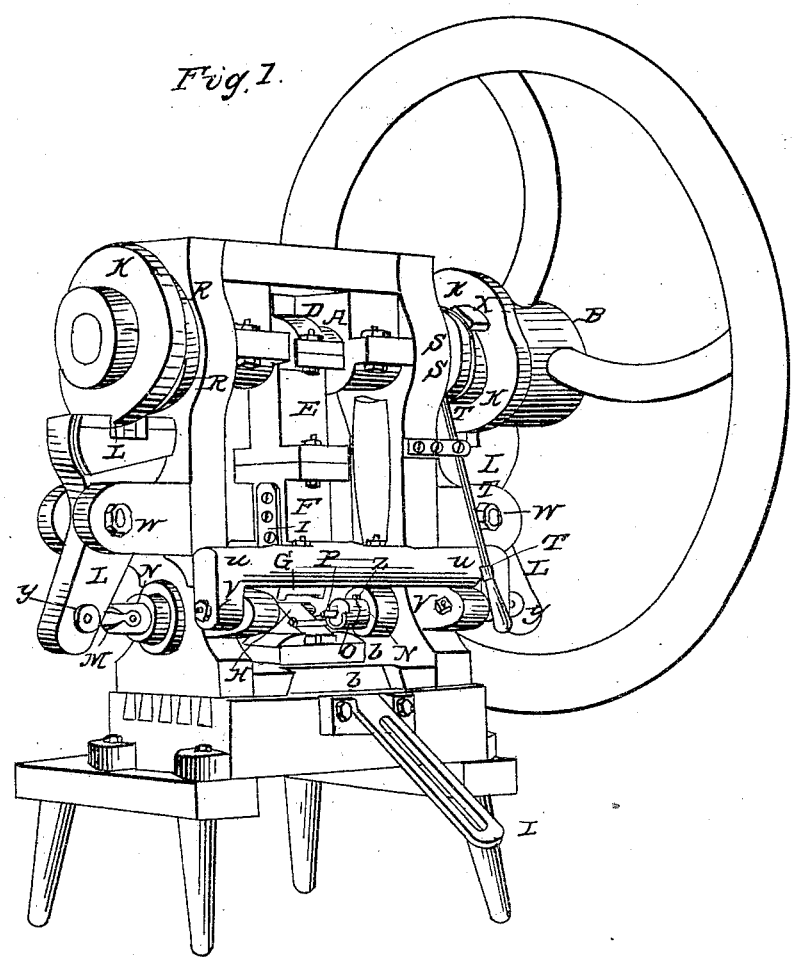

W. T. RICHARDS.
Making Carriage Springs.

No. 8,325.

2 Sheets—Sheet 1.

Patented Aug. 26, 1851.

W. T. RICHARDS.
Making Carriage Springs.
No. 8,325.
2 Sheets—Sheet 2.
Patented Aug. 26, 1851.
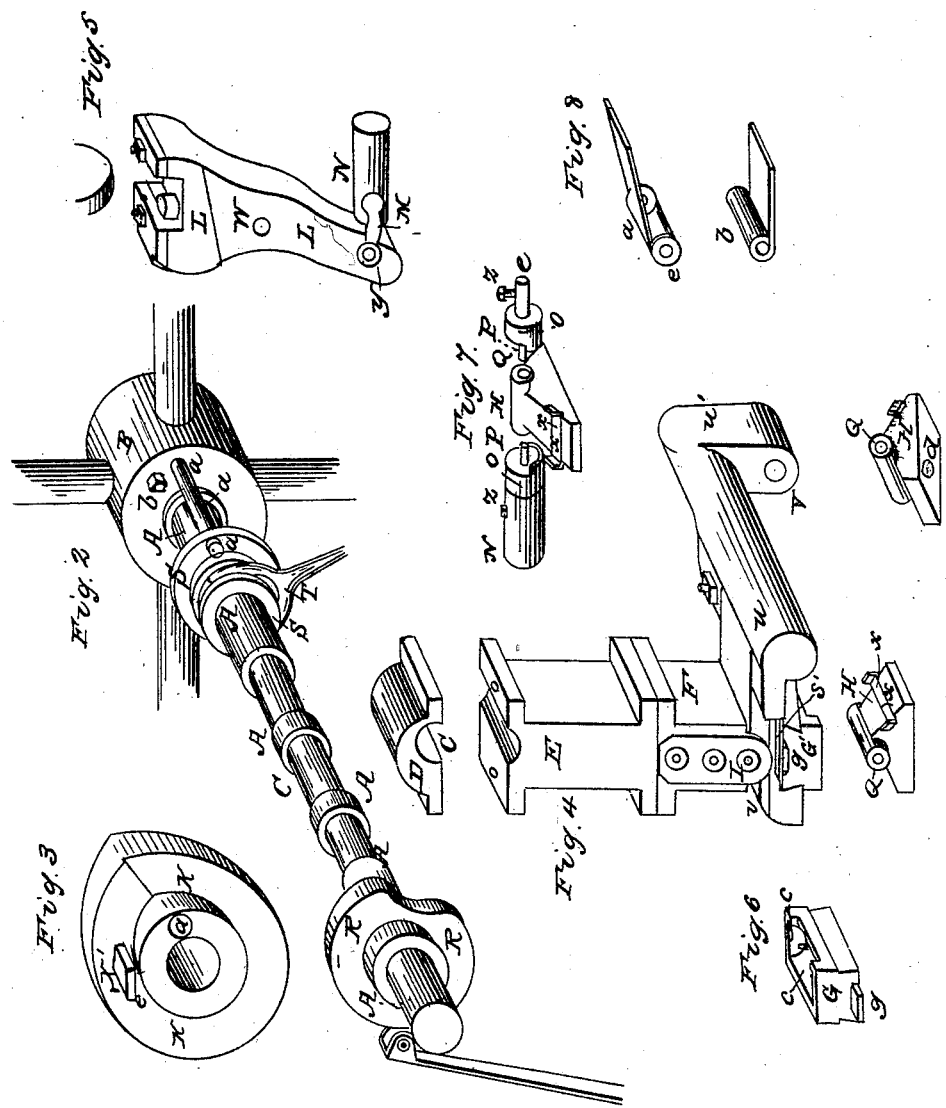

UNITED STATES PATENT OFFICE.

WM. T. RICHARDS, OF NEW HAVEN, CONNECTICUT.

MACHINERY FOR FORMING JOINTS OF ELLIPTICAL SPRINGS.

Specification of Letters Patent No. 8,325, dated August 26, 1851.

*To all whom it may concern:*

Be it known that I, WM. T. RICHARDS, of the city and county of New Haven, in the State of Connecticut, have invented a new and useful Improvement in Machinery for Forming the Joints of Elliptical Carriage-Springs; and I do hereby declare that the following is a full and exact description.

I attach the principal part of my new and improved machinery to the rotary power press for metals, and thereby move and actuate the several parts of it, so as to perform the successive operations, which are required to form the joints, or parts of joints accurately, and in quick succession, while the steel plate of the "leaf," or end of the leaf, which is being formed remains hot; and for this purpose, I place my press conveniently near to a common smith's fire.

Although my improvements may be attached to several kinds of metal presses similar to such as have been commonly known and used heretofore; and although presses similar to those hereinafter described, may have been used in other combinations, and for other purposes; yet I would be distinctly understood as making no claim to them, or any of them, or any parts of them, as heretofore used. I do not know that the joints in these springs were ever made by machinery of any kind except by myself; I formerly used a machine as an auxiliary, to perform a part of the work, together with the hand hamber; but it was entirely different from this herein described, in almost every respect; for that machine a patent was granted to me, dated Nov. 16th, 1841. In that machine the shell of the head joint was bent over a half cylindric die by the hand hammer, and the ears were also bent over the ends of this die, or small anvil by the hammer, and after this hammering had formed the head and ears, the punches and semicircular shears were moved up (for they must necessarily be removed away during the hammering) and the ears clipped and the holes in them punched, by the action of a lever operated by the foot of the workman. I use no part of the former machine in this, excepting something like the lower die, and the punches and circular shears, and these are combined, arranged and actuated very differently; and I therefore consider the machine herein described, much more as a new and different one, than as an improvement on the former.

To enable others skilled in presses for metals to build and use my invention I will proceed to describe the parts and operations.

The press to which I attach the principal parts of my machinery is represented with the parts in place, in perspective in the drawing annexed, and mark No. 1. It has a strong iron frame about 2½ feet high, and two feet wide, having a main crank and cam shaft passing through and across it, near 3 feet long, and about three inches diameter, marked A, with a fly-wheel B, on one end of it, with common devices for "shipping and unshipping," or connecting and disconnecting the fly-wheel and shaft, to move or stop it conveniently; as shown at S, T, T, &c., and more fully shown in sectional drawings Figure 2 at S, the sliding hub, with its bayonet-pin $a$, and trip-stud $b$, and the fork of T, of the shipping lever or handle; the bayonet-pin passes through the hole $a$, as shown in K, Fig. 3, when K is in proper place.

On the main shaft is the crank under D, and at C, in section which moves the sweep E, F. The lower end of this sweep is connected by a rolling joint to the strong arm U, at I and is connected to the cross-tree or arm-shaft $u$, $u$, in front of the frame. This arm-shaft has crank-like turns at its ends, by which it is jointed to studs at V, V, in front of the frame. The pivots on which this cross-tree hangs should be screws or their equivalent, to permit it to be moved and set endwise a little, to adjust and set the upper die exactly, in that direction, and hold it strongly when so adjusted.

On the underside of the arm U, and under the sweep, is placed the upper head die G, which is a concave, or semi-cylindric hollow one, and is also shown detached and inverted in sectional drawings at Fig. 6. The under head die is a semi-cylindric convex one, and matches the upper one, except that a suitable allowance should be made for the thickness of the plate or "leaf" between them, and this is shown in place in the perspective drawing at H, and in sections Fig. 7, &c., at H. The bed on which this die is set is movable backward and forward as indicated $b$, and $b$, in Fig. 1 in order to meet and agree very exactly with the upper one, because the backsides of these dies act like a pair of shears, to cut off any extra length of the "leaf" beyond the head joint, or socket for it, and it also requires to be movable in order to meet exactly the chucks and punches in the slide mandrels.

On the main shaft, on both outsides of the frame, are two side cams which move two short and strong side-levers L, L, &c., seen in the perspective in Fig. 1 and also in sectional Fig. 5. To the lower ends of these side-levers are jointed two sliding mandrels N, N, by toggle joints M at y. These mandrels are moved in opposite directions at the same time and alike and slide through holes in the opposite sides of the frame, the holes and mandrels well fitted, and made to range in the same line, and toward the cylindric part or pass of the lower die. The side levers are hung on pins near their centers W, W, and each of these pins pass through a pair of arms, or strong projections on each post of the frame, and so form fulcrums of the levers. The sliding mandrels have sockets in their inward ends to receive the stems of chucks, shown in O, O, Fig. 7. In the center of each chuck a punch is fitted P, P, and on the face of each chuck, about half around is a projection, resembling half a ring, projecting nearly as far as the point of the punch. The inside of these semicircular projections just fits the outsides of the pass on H, and operate as semicircular shears to cut away all surplus metal around the holes punched in the center of the ears, or in other words cut the surplus metal from the surface of the ears, through which the hole is made. And the action of the slide mandrels, with their shears and punches, on opposite sides of the lower die at the same time, nearly balance the pressure of each other, and have but little tendency to displace the lower die.

The crank and the two side cams K, K, are so arranged and placed on the shaft as never to permit the slide-mandrels, and the upper die to interfere with other in their operations; so that when the die is giving its pressure, the mandrels are receding, and when the die is receding the mandrels are approaching the lower die to perform their work.

To prepare the end of a "leaf" for forming the head-joint or socket on it, it must be suitably forged by common process,—that is, having a small flat piece of good iron laid across near the end of the steel plate of the leaf, and welded,—the iron projecting about one inch (more or less) on each edge of the steel plate, to form the pads or "ears" of sufficient size to describe within them the circle of the cylindric ends of the joint, and flattened somewhat thinner or wedge-like toward the end of the leaf; and when so suitably forged and moderately heated, it is laid upon the lower die, and held from a pin in a movable block set on the gage bar I, or by tongs. The dies being sufficiently open, the fly-wheel is then "shipped on" by the handle T, and the upper die comes down upon the hot plate, and bending down the ears sets and forms it into its proper half cylindric form,—the die leaves it immediately, and as it rises the slide-mandrels bring up their punches and shears, and finish the joint or socket as before described; but this head joint or socket would not of itself readily leave the deep depression of the upper die, into which it had been crowded, and to discharge it therefrom I place two short pins, or small punches passing down through the arch of the upper die, which pins are set in a small plate g, which is acted upon by two stiff springs or the sides of the arm U, at S', in Fig. 4. These discharging pins, seen at C, C, in G, Fig. 6, recede, bending their springs, while the presence of forming the head continues, but when it ceases, and the die begins to rise the head or socket is pushed out of its die by these discharging pins and their springs.

On the crank shaft, and on the backside of the left-hand cam K, there is an edge cam R, R, which is shown more clearly in section Fig. 2, with a depression on its edge, and upon it acts a spring-roller, immediately after the fly-wheel is "unshipped" or thrown out of connection; this spring roller stops the shaft in such manner that it readily starts into motion again when the fly-wheel is shipped on, without any unlocking or throwing off the roller.

I have now fully and exactly described a suitable rotary power press for metals, and adapted it to receive additional parts which I attach to it, and described them, and the movements and operations of them, and would here only say further the arrangement herein described is that which I consider the best, and prefer especially when the work is to be performed in only one press; and in this the work is performed better, more rapidly, with less heating and less labor, than it has ever heretofore been done.

I claim—

The combination of the hollow die with the lower die, and half circular shears, actuated in the manner substantially as herein described, and for the purpose herein set forth.

WM. T. RICHARDS.

In presence of—
 N. A. COUTHEY,
 ISAAC KELLOGG.